United States Patent
Pang et al.

(10) Patent No.: US 9,621,388 B2
(45) Date of Patent: Apr. 11, 2017

(54) METHOD FOR SERIAL DATA TRANSMISSION AND SYSTEM THEREFOR

(71) Applicant: SHENZHEN HUIDING TECHNOLOGY CO., LTD., Shenzhen, Guangdong (CN)

(72) Inventors: Shu Pang, Guangdong (CN); Jinchun Ye, Guangdong (CN)

(73) Assignee: SHENHEN HUIDING TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 14/786,542

(22) PCT Filed: Apr. 29, 2014

(86) PCT No.: PCT/CN2014/076486
§ 371 (c)(1),
(2) Date: Oct. 22, 2015

(87) PCT Pub. No.: WO2014/206141
PCT Pub. Date: Dec. 31, 2014

(65) Prior Publication Data
US 2016/0080185 A1 Mar. 17, 2016

(51) Int. Cl.
*H04K 1/10* (2006.01)
*H04L 27/26* (2006.01)
*G06F 13/38* (2006.01)

(52) U.S. Cl.
CPC ............ *H04L 27/26* (2013.01); *G06F 13/382* (2013.01)

(58) Field of Classification Search
CPC .............. H04L 1/1829; H03M 2201/17; H04J 13/0074; H04J 3/0605; H04N 19/90
See application file for complete search history.

(56) References Cited

U.S. PATENT DOCUMENTS

| | | | | |
|---|---|---|---|---|
| 5,270,714 A | * | 12/1993 | Tanaka | H03M 5/145 341/100 |
| 6,262,676 B1 | * | 7/2001 | King | G06F 7/026 341/96 |
| 7,869,698 B2 | * | 1/2011 | Ito | G11B 20/1217 386/248 |
| 2010/0296589 A1 | * | 11/2010 | Maeda | H04L 25/4917 375/257 |

* cited by examiner

*Primary Examiner* — Khanh C Tran

(57) ABSTRACT

A method and system for serial data transmission are provided. The method includes steps of: bit-synchronously receiving N bit binary code data which is transmitted continuously and repeatedly by a transmitting end, wherein the N bit binary code data is N bit binary code data converted from original data by the transmitting end on the basis of a preset rule; performing cyclic left shift or right shift 0 to N−1 times on each of the received N bit binary code data, which results in a data set, and obtaining an extreme value in the data set; and decoding the extreme value, which results in the original data transmitted by the transmitting end. With the method and system, a start and an end flags are not needed to be added additionally during the serial data transmission, thus improving the efficiency of the serial data transmission.

9 Claims, 2 Drawing Sheets

--- bit-synchronously receiving N bit binary code data which is transmitted continuously and repeatedly by a transmitting end — 101 performing cyclic left shift or right shift 0 to N-1 times on each of said received N bit binary code data, which results in a data set, and obtaining a maximum value of said data set — 102 decoding said maximum value, which results in the original data actually transmitted by the transmitting end — 103

METHOD FOR SERIAL DATA TRANSMISSION AND SYSTEM THEREFOR

TECHNICAL FIELD

The present invention belongs to the technical field of communications, and particularly, to a method for serial data transmission and a system therefor.

BACKGROUND ART

In serial data transmission, because data is serially transmitted on a bit by bit basis, while the minimum value unit of the data that we usually need to transmit is character, if the transmission is done by directly using natural binary code of the character without inserting a special start and a special stop signals, then a receiving end cannot parse the received data. For example, if one character is 8 bit binary number, when a transmitting end transmits data of 1, 2, and 3, a data stream transmitted in a channel is 00000001 00000010 00000011. As the receiving end cannot determine the start bit of the character, the received data may be wrong data, which is 00000010 00000100 00000110 (i.e., 2, 4, 6) or 00000100 00001000 00001100 (i.e., 4, 8, 12), etc. In order to avoid this issue, the common practice is to use a special flag bit to identify the start bit of the character (for example, in a UART protocol, a start bit and an end bit are added to identify the start and end of the character), but the disadvantage of this practice is that an additional flag bit is needed to be transmitted, which causes that the transmission efficiency becomes low.

INVENTION SUMMARY

The present invention provides a method for serial data transmission and a system therefor, wherein a start and an end flags are not needed to be added additionally during the serial data transmission and a receiving end can restore original data even if starting to receive data at any time, thus improving the efficiency of the serial data transmission.

The present invention adopts the following technical solutions:

A method for serial data transmission, said method comprising the steps of:

bit-synchronously receiving N bit binary encoded data which is transmitted continuously and repeatedly by a transmitting end, wherein said N bit binary encoded data is N bit binary encoded data converted from original data by the transmitting end on the basis of a preset rule;

performing cyclic left shift or right shift 0 to N−1 times on each of said received N bit binary encoded data, which results in a data set, and obtaining an extreme value of said data set; and decoding said extreme value, which results in the original data transmitted by the transmitting end.

Specifically, said preset rule is established according to the following manner:

performing, in turn, cyclic left shift or right shift 0 to N−1 times on each element of the N bit binary data set, which results in the data set, and obtaining the extreme value in said data set, and if the extreme value equals to said element, then said extreme value belongs to a N bit binary code database; and establishing a mapping relationship between the original data to be actually transmitted and each binary code in the N bit binary code database.

Said extreme value is a maximum value or a minimum value.

Wherein, before decoding said extreme value, which results in the original data to be actually transmitted by the transmitting end, further comprising a step of:

comparing two continuously received data, and if being the same, then the data is correct, otherwise discarding said data.

A method for serial data transmission is also disclosed in an embodiment of the present invention, said method comprising the steps of:

converting original data to be actually transmitted into N bit binary encoded data on the basis of a preset rule; and continuously and repeatedly transmitting said N bit binary encoded data.

The detailed steps of converting the original data to be actually transmitted into the N bit binary code on the basis of the predetermined rule are:

performing, in turn, cyclic left shift or right shift 0 to N−1 times on each element of a N bit binary data set, which results in a data set, and obtaining the extreme value of said data set, and if said extreme value equals to said element, then said extreme value belongs to a N bit binary code database; and establishing a mapping relationship between the original data to be actually transmitted and each binary code in the N bit binary code database.

Specifically, said extreme value is a maximum value or a minimum value.

A system for serial data transmission is also disclosed in an embodiment of the present invention, comprising a transmitting end and a receiving end, and said transmitting end comprises an encoding function module and a transmitting module, wherein said encoding function module is used to convert original data to be actually transmitted by the transmitting end into N binary code on the basis of a preset rule, and said transmitting module is used to continuously and repeatedly transmit said N bit binary code to the receiving end;

said receiving end comprises a receiving module, a pre-decoding function module, and a decoding function module, wherein said receiving module is used to bit synchronously receive the N bit binary code continuously and repeatedly transmitted by the transmitting end, and said pre-decoding function module is used to convert the data received by the receiving end after only a bit synchronization on the basis of a preset rule, so as to restore the N bit binary code transmitted by the transmitting end; and said decoding module is connected to the pre-decoding function module and used to restore the original data from said N bit binary code.

Said encoding function module performs, in turn, cyclic left shift or right shift 0 to N−1 times on each element of a N bit binary set, which results in a data set, and obtains the extreme value of said data set, and if the extreme value equals to said element, then said extreme value belongs to a N bit binary code database, and establishes a mapping relationship between the original data to be actually transmitted and each binary code in the N bit binary code database.

Further, the system for the serial data transmission in the embodiment of the present invention also comprises a check module, which is connected between the pre-decoding function module and the decoding function module and used to compare two continuous pre-decoded data, and if being the same, then the data is correct, otherwise said data is discarded.

Compared to the prior art, the advantageous effects of the present invention lie in that: a start and an end flags are not needed to be added additionally during the serial data transmission, and a receiving end can restore the original data even if starting to receive data at any time, thus improving the efficiency of the serial data transmission.

DETAILED EMBODIMENTS

To make the objectives, technical solutions, and advantages of the present invention more comprehensible, the following further describes the present invention in detail with reference to the accompanying drawings and embodiments. It is understandable that the specific embodiment described herein is only used to explain the present invention and is not intended to limit the present invention.

In the present invention, with the encoding scheme, a start and an end flags are not needed to be added additionally during the serial data transmission, and a receiving end can restore the original data even if starting to receive data at any time, thus improving the efficiency of the serial data transmission.

First Embodiment

Figure 1:
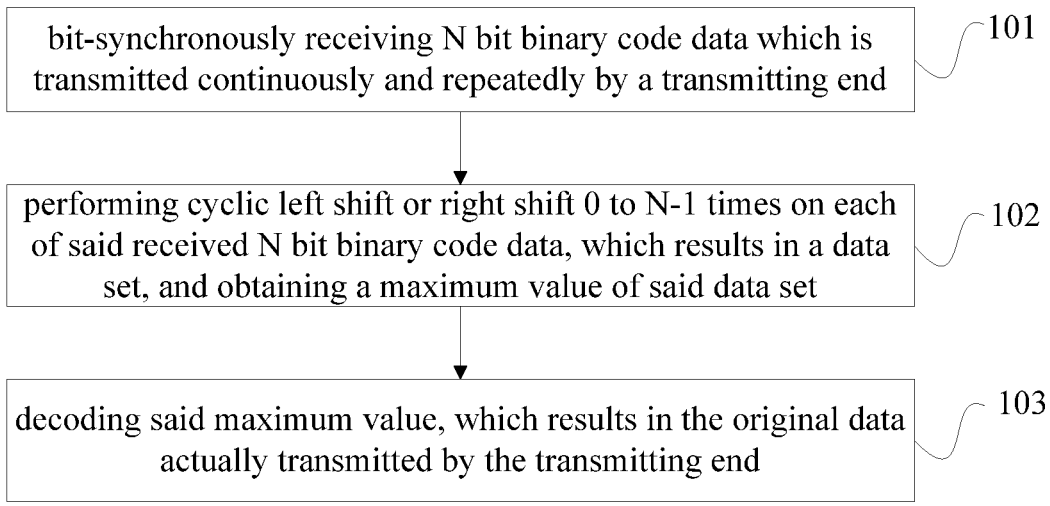
FIG. 1 is a flowchart of a method for serial data transmission disclosed in a first embodiment of the present invention.

As shown in FIG. 1, a method for serial data transmission is disclosed in the present invention, comprising the following steps:

Step 101: bit-synchronously receiving N bit binary code data which is transmitted continuously and repeatedly by a transmitting end, wherein said N bit binary code data is the N bit binary code data converted from original data by the transmitting end on the basis of a preset rule;

In the present embodiment, the preset rule is established in the following way: performing, in turn, cyclic left shift or right shift 0 to N−1 times on each element in a N bit binary data set, which results in a data set, and obtaining the maximum value of said data set, and if said maximum value equals to said element, then said maximum value belongs to a N bit binary code database, and then establishing a mapping relationship between the original data to be actually transmitted and each binary code in the N bit binary code database.

A preset binary database is denoted as S, and a set of all the N bit binary numbers is denoted as Q. For $\forall x \in Q$, if x equals to a maximum value of a set P resulted from performing cyclic right shift (or left shift) 0 to N−1 times on x, then x∈S.

In the following, taking the 3 bit binary data as an example for explanation, for the 3 bit binary data, the 3 bit binary number set Q={000, 001, 010, 011, 100, 101, 110, 111}.

Taking x=000, the set P resulted from performing the cyclic right shift (or left shift) 0 to 2 times on x is {000, 000, 000}, wherein the maximum value of the P is 000, which equals to x, thus 000 belongs to the set S;

Taking x=001, the set P resulted from performing the cyclic right shift (or left shift) 0 to 2 times on x is {001, 010, 100}, wherein the maximum value of the P is 100, which does not equal to x, thus 001 does not belong to the set S;

Taking x=010, the set P resulted from performing the cyclic right shift (or left shift) 0 to 2 times on x is {010, 100, 001}, wherein the maximum value of the P is 100, which does not equal to x, thus 010 does not belong to the set S;

Taking x=011, the set P resulted from performing the cyclic right shift (or left shift) 0 to 2 times on x is {011, 110, 101}, wherein the maximum value of the P is 110, which does not equal to x, thus 011 does not belong to the set S;

Taking x=100, the set P resulted from performing the cyclic right shift (or left shift) 0 to 2 times on x is {100, 001, 010}, wherein the maximum value of the P is 100, which equals to x, thus 100 belongs to the set S;

Taking x=101, the set P resulted from performing the cyclic right shift (or left shift) 0 to 2 times on x is { 101, 011, 110}, wherein the maximum value of the P is 110, which does not equal to x, thus 101 does not belong to the set S;

Taking x=110, the set P resulted from performing the cyclic right shift (or left shift) 0 to 2 times on x is {110, 101, 011}, wherein the maximum value of the P is 110, which equals to x, thus 110 does not belong to the set S;

Taking x=111, the set P resulted from performing the cyclic right shift (or left shift) 0 to 2 times on x is {111, 111, 111}, wherein the maximum value of the P is 111, which equals to x, thus 111 belongs to the set S;

In summary, it can be obtained that the set S of the maximum values of the 3 bit binary code database is {000, 100, 110, 111}.

Similarly, it is easy to obtain that the set S of the maximum values of the 4 bit binary code database equals to {0000, 1000, 1010, 1100, 1110, 1111}.

The set S of the maximum values of the 5 bit binary code database equals to {00000, 10000, 10100, 11000, 11010, 11100, 11110, 11111}.

The set S of the maximum values of the 6 bit binary code database equals to { 000000, 100000, 100100, 101000, 101010, 110000, 110010, 110100, 110110, 111000, 111010, 111100, 111110, 111111}.

The set S of the maximum values of the 7 bit binary code database equals to { 0000000, 1000000, 1001000, 1010000, 1010100, 1100000, 1100010, 1100100, 1101000, 1101010, 1101100, 1110000, 1110010, 1110100, 1110110, 1111000, 1111010, 1111100, 1111110, 1111111}.

The set S of the maximum values of the 8 bit binary code database is {00000000, 10000000, 10001000, 10010000, 10100000, 10100100, 10101000, 10101010, 11000000, 11000010, 11000100, 11001000, 11001010, 11001100, 11010000, 11010010, 11010100, 11011000, 11011010, 11100000, 11100010, 11100100, 11100110, 11101000, 11101010, 11101100, 11101110, 11110000, 11110010, 11110100, 11110110, 11111000, 11111010, 11111100, 11111110, 11111111}.

It can be seen that: with the increment of the number of binary code bits, the number of the elements in the binary code database set S will become more and more. The encoding function is constituted by pre-selecting binary code database meeting the number of the characters according to the number of the characters needed to be transmitted, and pre-establishing a mapping relationship between the character and binary code database.

Step 102: performing cyclic right shift (or left shift) 0 to N−1 times on each of said received N bit binary code data, which results in a data set, and obtaining a maximum value in said data set;

The transmitting end continuously and repeatedly transmits the data from encoding the original data needed to be transmitted, while the receiving end performs cyclic right shift (or left shift) 0 to N−1 times on the received binary code data (N is the number of the bits of the binary data), and the maximum value in the resulted set is the binary code data transmitted by the transmitting end.

Step 103: decoding said maximum value, which results in the original data actually transmitted by the transmitting end.

Example 1: the following is an example of a set of encoding and decoding functions meeting said rule and the transmission thereof.

The mapping relationship of the encoding function y=F(x) is as follows:

| x | 0 | 1 | 2 | 3 | 4 | 5 | 6 | 7 |
|---|---|---|---|---|---|---|---|---|
| y (5 bit binary number) | 00000 | 10000 | 10100 | 11000 | 11010 | 11100 | 11110 | 11111 |

The pre-coding function y=g(s) is defined as the maximum value resulted from performing the cyclic right shift 0~4 times on y=s.

The mapping relationship of the decoding function is as follows:

| | x | | | | | | | |
|---|---|---|---|---|---|---|---|---|
| | 0 | 1 | 2 | 3 | 4 | 5 | 6 | 7 |
| y (5 bit binary number) | 00000 | 10000 | 10100 | 11000 | 11010 | 11100 | 11110 | 11111 |

When the original data needed to be transmitted by the transmitting end is 2, the data after being encoded with the encoding function is F(2)=10100. Because the transmitting end will continuously and repeatedly transmit the encoded data all the time, the following binary string can be seen on the channel: . . . 101001010010100 . . . . As the receiving end only performs bit synchronization and the start time of the reception is also indefinite, the data received by the receiving end is s∈{110100, 01001, 10010, 00101, 01010}. g(10100)=10100, g(01001)=10100, g(10010)=10100, g(00101)=10100, g(01010)=10100 are obtained by pre-decoding the s with the above pre-decoding function, i.e., g(s)=10100, s∈{110100, 01001, 10010, 00101, 01010}. The final decoded data is f(10100)=2, and the communications is ended.

Wherein, the calculation procedure of g(01001)=10100 is as follows:

Performing cyclic right shift 0 time on 01001 is 01001,
Performing cyclic right shift one time on 01001 is 10100,
Performing cyclic right shift two times on 01001 is 01010,
Performing cyclic right shift three times on 01001 is 00101,
Performing cyclic right shift four times on 01001 is 10010, The maximum value of these five shifts is MAX(01001, 10100, 01010, 00101, 10010)=10100, i.e., g(01001)=10100.

Example 2: the following is another set of encoding and decoding functions meeting the rule.

The mapping relationship between the encoding function y=F(x) and the decoding function x=f(y) is as follows:

| x | y (6 bit binary number) |
|---|---|
| 0 | 000000 |
| 1 | 100000 |
| 2 | 100100 |
| 3 | 101000 |
| 4 | 101010 |
| 5 | 110000 |
| 6 | 110010 |
| 7 | 110100 |
| 8 | 110110 |
| 9 | 111000 |
| 10 | 111010 |
| 11 | 111100 |

-continued

| x | y (6 bit binary number) |
|---|---|
| 12 | 111110 |
| 13 | 111111 |

The pre-coding function y=g(s) is defined as the maximum value resulted from performing cyclic right shift 0~5 times on y=s.

For example, if the data is transmitted with 5 bit code, the set of said 5 bit codes is {00000, 10000, 10100, 11000, 11010, 11100, 11110, 11111}. When the transmitting end transmits code 11010, the data stream in the channel is 11010 11010 11010. As the start bit of the data received by the receiving end is indefinite, it is easy to obtain that the data received by the receiving end belongs to the set {11010, 10101, 01011, 10110, 01101} according to the different start bits.

If the received data is 11010, the set of the results of performing cyclic right shift 0 to 4 times on it is {11010, 10101, 01011, 10110, 01101}, and it is easy to understand that the maximum value, which is 11010, is the code transmitted by the transmitting end;

If the received data is 10101, the set of the results of performing cyclic right shift 0 to 4 times on it is {10101, 01011, 10110, 01101, 11010}, and it is easy to understand that the maximum value, which is 11010, is the code transmitted by the transmitting end;

If the received data is 01011, the set of the results of performing cyclic right shift 0 to 4 times on it is {01011, 10110, 01101, 11010, 10101}, and it is easy to understand that the maximum value, which is 11010, is the code transmitted by the transmitting end;

If the received data is 10110, the set of the results of performing cyclic right shift 0 to 4 times on it is {10110, 01101, 11010, 10101, 01011}, and it is easy to understand that the maximum value, which is 11010, is the code transmitted by the transmitting end;

If the received data is 01101, the set of the results of performing cyclic right shift 0 to 4 times on it is {01101, 11010, 10101, 01011, 10110}, and it is easy to understand that the maximum value, which is 11010, is the code transmitted by the transmitting end;

In summary, it can be obtained that: no matter from which bit the receiving end starts to receive data, the original data transmitted by the transmitting end can always be restored after conversion of performing cyclic shift and resolving the extreme value (the maximum value or minimum value). Similarly, it can be verified that as long as transmitting the code data, the receiving end can restore the original data transmitted by the transmitting end.

In the present invention, with the encoding scheme, a start and an end flag signals are not needed to be transmitted additionally during the serial data transmission, and the receiving end can restore the original data even if starting to receive data at any time.

Second Embodiment

Figure 2:
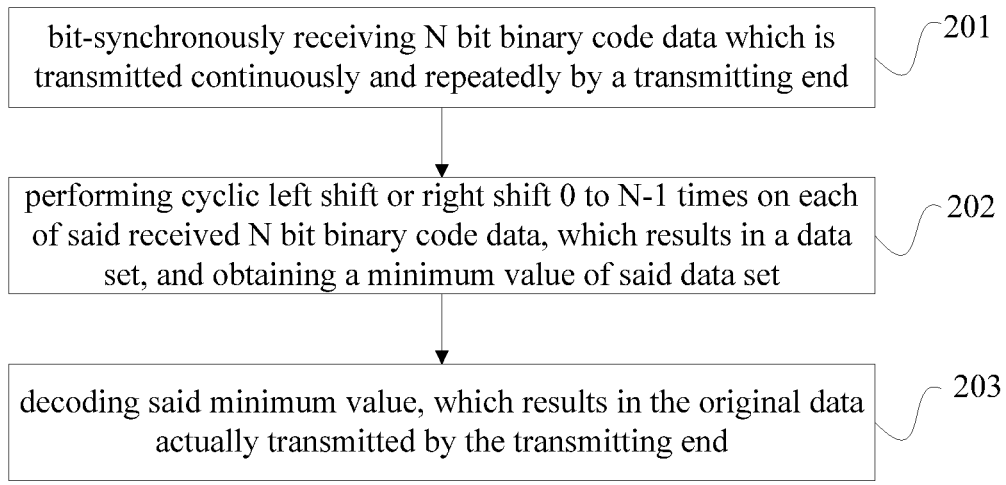
FIG. 2 is a flowchart of a method for serial data transmission disclosed in a second embodiment of the present invention.

Please refer to FIG. 2, a method for serial data transmission is also disclosed in the present invention, comprising the following steps:

Step 201: bit-synchronously receiving N bit binary code data which is transmitted continuously and repeatedly by a transmitting end, wherein said N bit binary code data is N bit binary code data converted from original data by the transmitting end on the basis of a preset rule;

In the present embodiment, the preset rule is established in the following way: performing, in turn, cyclic left shift or right shift 0 to N−1 times on each element in a N bit binary data set, which results in a data set, and obtaining the minimum value in said data set, and if said minimum value equals to said element, then said minimum value belongs to a N bit binary code database, and then establishing a mapping relationship between the original data to be actually transmitted and each binary code in the N bit binary code database.

A preset binary database is denoted as S, and a set of all the N bit binary numbers is denoted as Q. For ∀x∈Q, if x equals to a minimum value of a set P resulted from performing cyclic right shift (or left shift) 0 to N−1 times on x, then x∈S.

In the following, taking the 3 bit binary data as an example for explanation, for the 3 bit binary data, the 3 bit binary data set Q={000, 001, 010, 011, 100, 101, 110, 111}.

Taking x=000, the set P resulted from performing the cyclic right shift (or left shift) 0 to 2 times on x is {000, 000, 000}, wherein the minimum value of the P is 000, which equals to x, thus 000 belongs to the set S;

Taking x=001, the set P resulted from performing the cyclic right shift (or left shift) 0 to 2 times on x is {001, 010, 100}, wherein the minimum value of the P is 001, which equals to x, thus 001 belongs to the set S;

Taking x=010, the set P resulted from performing the cyclic right shift (or left shift) 0 to 2 times on x is {010, 100, 001}, wherein the minimum value of the P is 001, which does not equal to x, thus 010 does not belong to the set S;

Taking x=011, the set P resulted from performing the cyclic right shift (or left shift) 0 to 2 times on x is {011, 110, 101}, wherein the minimum value of the P is 011, which equals to x, thus 011 belongs to the set S;

Taking x=100, the set P resulted from performing the cyclic right shift (or left shift) 0 to 2 times on x is {100, 001, 010}, wherein the minimum value of the P is 001, which does not equal to x, thus 100 does not belong to the set S;

Taking x=101, the set P resulted from performing the cyclic right shift (or left shift) 0 to 2 times on x is {101, 011, 110}, wherein the minimum value of the P is 011, which does not equal to x, thus 101 does not belong to the set S;

Taking x=110, the set P resulted from performing the cyclic right shift (or left shift) 0 to 2 times on x is {110, 101, 011}, wherein the minimum value of the P is 011, which does not equal to x, thus 110 does not belong to the set S;

Taking x=111, the set P resulted from performing the cyclic right shift (or left shift) 0 to 2 times on x is {111, 111, 111}, wherein the minimum value of the P is 111, which equals to x, thus 111 belongs to the set S;

In summary, it can be obtained that the set S of the maximum value in the 3 bit binary code database is {000, 100, 110, 111}.

Similarly, it is easy to obtain that the set S of the 4 bit binary code database equals to {0000, 1000, 1010, 1100, 1110, 1111}.

The set S of the 5 bit binary code database equals to {00000, 00001, 01011, 00011, 00101, 00011, 00001, 0000}.

Step 102: performing cyclic left shift or right shift 0 to N−1 times on each of said received N bit binary code data, which results in a data set, and obtaining a minimum value in said data set;

The transmitting end continuously and repeatedly transmits the data from encoding the original data needed to be transmitted, while the receiving end performs cyclic right shift (or left shift) 0 to N−1 times on the received binary code data (N is the number of the bits of the binary data), and the minimum value in the resulted set is the binary code data transmitted by the transmitting end.

Step 203: decoding said minimum value, which results in the original data actually transmitted by the transmitting end.

Third Embodiment

Figure 3:
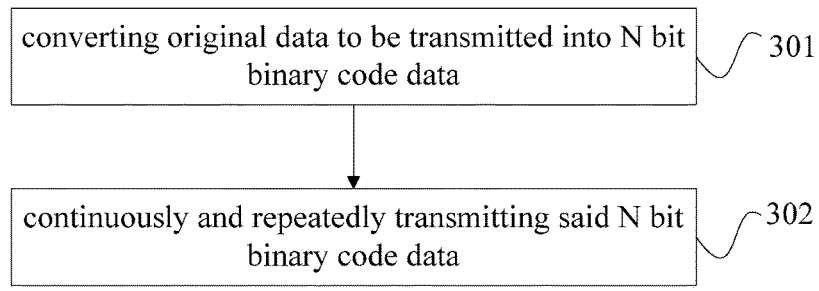
FIG. 3 is a flowchart of a method for serial data transmission disclosed in a third embodiment of the present invention.

Please refer to FIG. 3, a method for serial data transmission is also disclosed in the present invention, said method comprising the steps of:

Step 301: converting original data to be transmitted into N bit binary code data on the basis of a preset rule;

In this step, a transmitting end performs, in turn, cyclic left shift or right shift 0 to N−1 times on each element in the N bit binary data set, which results in a data set, and obtains the extreme value (maximum value or minimum value) in said data set, and if the extreme value equals to said element, then said extreme value belongs to a N bit binary code database, and then establishes a mapping relationship between the original data to be actually transmitted and the N bit binary code database. Then, when the original data is transmitted, what is actually transmitted is the N bit binary code data corresponding to said original data.

Step 302: continuously and repeatedly transmitting said N bit binary code data.

Fourth Embodiment

Figure 4:
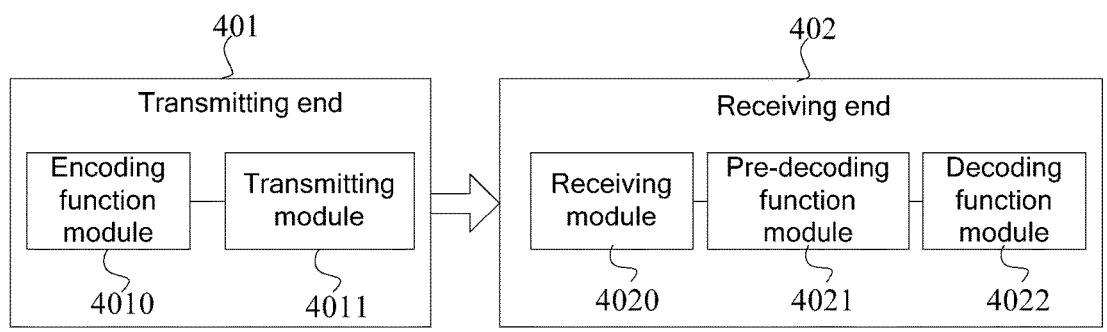
FIG. 4 is a block diagram of a system for serial data transmission disclosed in a fourth embodiment of the present invention.

Please refer to FIG. 4, a system for serial data transmission is also disclosed in the present invention. The system for serial data transmission comprises a transmitting end 401 and a receiving end 402, and the transmitting end further comprises an encoding function module 4010 and a transmitting module 4011, wherein the encoding function module 4010 is used to convert original data to be actually transmitted by the transmitting end into N binary code, and the transmitting module 4011 is used to continuously and repeatedly transmit the N bit binary code to the receiving end. In the present embodiment, the encoding function module 4010 performs, in turn, cyclic left shift or right shift 0 to N−1 times on each element in a N bit binary set, which results in a data set, and obtains the extreme value of said data set, and if said extreme value equals to the element, then said extreme value belongs to a N bit binary code database, and then establishes a mapping relationship between the original data and a preset binary code database. Then, when the original data is transmitted, what is actually transmitted is the N bit binary code data corresponding to said original data.

The receiving end 402 comprises a receiving module 4020, a pre-decoding function module 4021, and a decoding function module 4022, wherein the receiving module 4020 is used to bit synchronously receive the N bit binary code continuously and repeatedly transmitted by the transmitting end, and the pre-decoding function module 4021 is used to convert the data received by the receiving end after only a bit synchronization on the basis of the preset rule, so as to restore the N bit binary code data transmitted by the transmitting end. The decoding module 4022 is connected to the pre-decoding function module 4021 and used to restore the original data transmitted by the transmitting end from the N bit binary code data.

Fifth Embodiment

Figure 5:
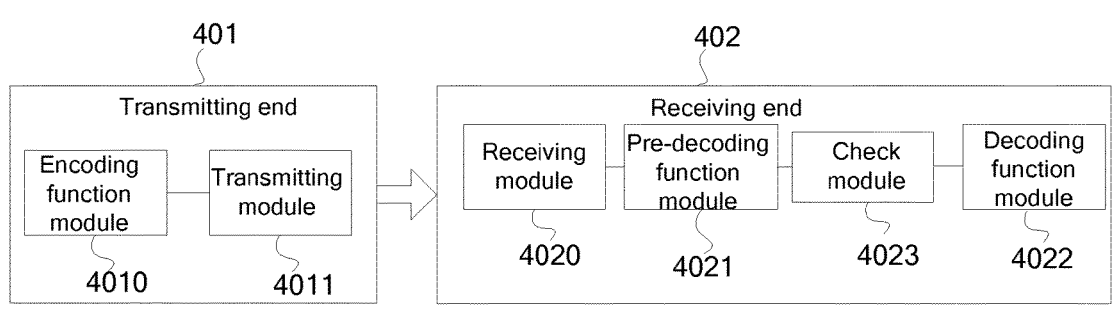
FIG. 5 is a block diagram of a system for serial data transmission disclosed in a fifth embodiment of the present invention.

Please refer to FIG. 5, in order to improve the accuracy of the system for serial data transmission, the system for the serial data transmission also comprises a check module 4023, and the check module 4023 is connected between the pre-decoding function module 4021 and the decoding function module 4022 and is used to compare two continuous pre-decoded data, and if being the same, then the data is correct, otherwise the data is discarded.

A start and an end flag signals are not needed to be added additionally when the system shown in the present invention transmits the serial data by utilizing the encoding scheme, and a receiving end can restore the original data even if starting to receive data at any time.

The above description is only preferred embodiments of the present invention, and is not used to limit the present invention. Any modification, equivalent substitution, improvement, and so on, which are made within the spirits and principles of the present invention, should be all contained in the claimed scope of the present invention.

INDUSTRIAL APPLICABILITY

Compared to the prior art, the advantageous effects of the present invention lie in that: a start and an end flags are not needed to be added additionally during the serial data transmission, and a receiving end can restore the original data even if starting to receive data at any time, thus improving the efficiency of the serial data transmission.

What is claimed is:

1. A method for serial data transmission, said method comprising the steps of:
   bit-synchronously receiving N bit binary code data which is transmitted continuously and repeatedly by a transmitting end, wherein said N bit binary code data is N bit binary code data converted from original data by the transmitting end on the basis of a preset rule;
   performing cyclic left shift or right shift 0 to N−1 times on each of said received N bit binary code data, which results in a data set, and obtaining an extreme value of said data set; and
   decoding said extreme value, which results in the original data transmitted by the transmitting end.

2. The method for said serial data transmission according to claim 1, wherein said preset rule is established according to the following manner:
   performing, in turn, cyclic left shift or right shift 0 to N−1 times on each element in the N bit binary data set, which results in the data set, and obtaining the extreme value in said data set, and if the extreme value equals to said element, then said extreme value belongs to a N bit binary code database; and
   establishing a mapping relationship between the original data to be actually transmitted and each binary code in the N bit binary code database.

3. The method for said serial data transmission according to claim 2, wherein said extreme value is a maximum value or a minimum value.

4. The method for said serial data transmission according to claim 1, wherein said extreme value is a maximum value or a minimum value.

5. The method for said serial data transmission according to claim 1, wherein, before decoding said extreme value, which results in the original data to be actually transmitted by the transmitting end, further comprising a step of:
   comparing two continuously received data, and if being the same, then the data is correct, otherwise discarding said data.

6. A method for serial data transmission, said method comprising the steps of:
   converting original data to be actually transmitted into N bit binary code data on the basis of a preset rule; and
   continuously and repeatedly transmitting said N bit binary code data;
   wherein the predetermined rule is established in a following way:
   performing, in turn, cyclic left shift or right shift 0 to N−1 times on each element in a N bit binary data set, which results in a data set, and obtaining an extreme value in said data set, and if said extreme value equals to said element, then said extreme value belongs to a N bit binary code database; and
   establishing a mapping relationship between the original data to be actually transmitted and each binary code in the N bit binary code database.

7. The method for said serial data transmission according to claim 6, wherein said extreme value is a maximum value or a minimum value.

8. A system for serial data transmission, comprising a transmitting end and a receiving end, and said transmitting end comprises an encoding function module and a transmitting module, wherein said encoding function module is used to convert original data to be actually transmitted by the transmitting end into N binary code on the basis of a preset rule, and said transmitting module is used to continuously and repeatedly transmit said N bit binary code to the receiving end;

said receiving end comprises a receiving module, a pre-decoding function module, and a decoding function module, wherein said receiving module is used to bit synchronously receive the N bit binary code continuously and repeatedly transmitted by the transmitting end, and said pre-decoding function module is used to convert the data received by the receiving end after only a bit synchronization on the basis of a preset rule, so as to restore the N bit binary code transmitted by the transmitting end; and said decoding module is connected to the pre-decoding function module and used to restore said N bit binary code to the original data;

wherein said encoding function module performs, in turn, cyclic left shift or right shift 0 to N−1 times on each element in a N bit binary set, which results in a data set, and obtains an extreme value of said data set, and if said extreme value equals to said element, then said extreme value belongs to a N bit binary code database, and establishes a mapping relationship between the original data to be actually transmitted and each binary code in the N bit binary code database.

9. The system for said serial data transmission according to claim 8, wherein further comprising a check module, which is connected between the pre-decoding function module and the decoding function module and used to compare two continuous pre-decoded data, and if being the same, then the data is correct, otherwise said data is discarded.

* * * * *